United States Patent [19]
Wise et al.

[11] Patent Number: 5,783,297
[45] Date of Patent: Jul. 21, 1998

[54] MATERIALS FOR SHOCK ATTENUATION

[75] Inventors: Sean Wise, Millersville; Claudio J. Herzfeld, Suitland, both of Md.

[73] Assignee: Cemcom Corporation, Baltimore, Md.

[21] Appl. No.: 515,734

[22] Filed: Aug. 16, 1995

[51] Int. Cl.[6] .................................................. B32B 3/26
[52] U.S. Cl. ............................. 428/304.4; 428/307.3; 428/307.7; 428/312.2; 428/314.4; 428/318.4; 428/318.6; 428/319.1; 106/605
[58] Field of Search .............................. 106/457, 459, 106/675, 679, 681, 725, 732, 738; 428/304.4, 307.3, 307.7, 312.2, 314.4, 318.4, 318.6, 319.1

[56] References Cited

U.S. PATENT DOCUMENTS 4,504,320  3/1985  Rizer et al. ................................ 106/98

*Primary Examiner*—Richard Weisberger
*Attorney, Agent, or Firm*—Lawrence I. Field

[57] ABSTRACT

Materials with exceptional shock attenuating properties are chemically bonded ceramics having densities that range from 30 to 160 lb/cubic foot (0.48 to 2.56 g/cc) and porosities of 20% to 80%. The materials are chemically bonded ceramic composites based on Portland cement, silica fume, various hollow fillers, and may include a dispersing agent, any of a variety of fibers and water.

20 Claims, 8 Drawing Sheets

Strength vs. density for porous, shock attenuating chemically bonded ceramics (SA/CBC) which are compared to the strength-density relationships found in ordinary cement based materials.

Strength vs. density for porous, shock attenuating chemically bonded ceramics (SA/CBC) which are compared to the strength-density relationships found in ordinary cement based materials.

Generalized hugoniot of SA/CBC in stress-volume space.

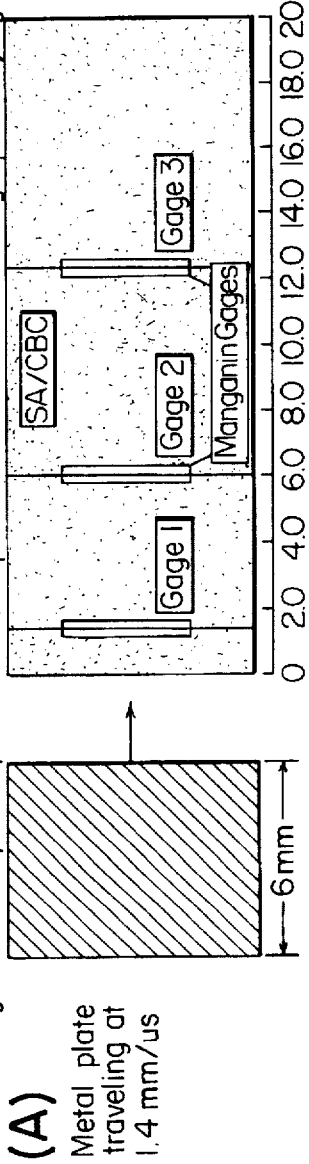

FIG. 3(A)

Figs. 3A-E Graphic depiction of the response of SA/CBC material being impacted by high speed flyer plate Metal plate traveling at 1.4 mm/us

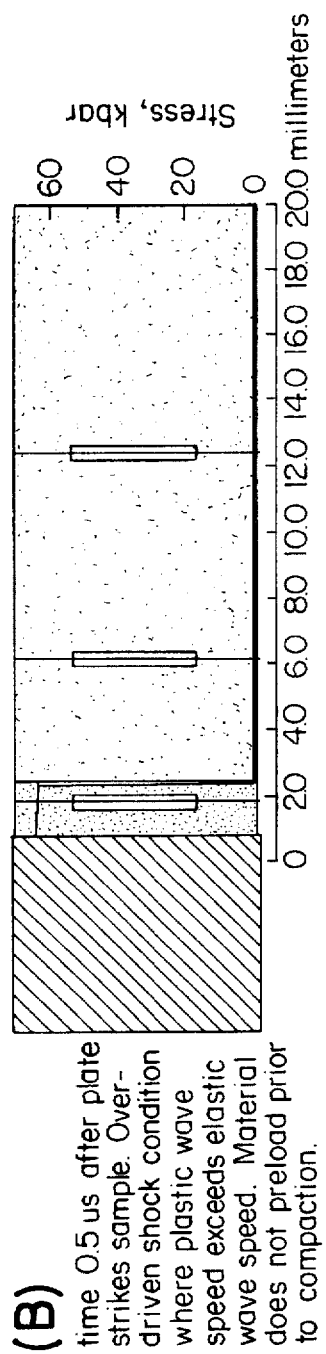

FIG. 3(B)

time 0.5 us after plate strikes sample. Over-driven shock condition where plastic wave speed exceeds elastic wave speed. Material does not preload prior to compaction.

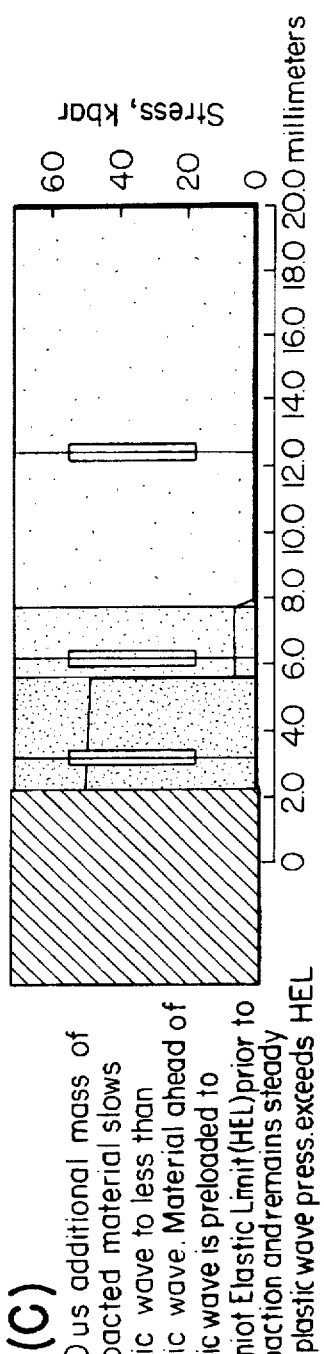

FIG. 3(C)

t=2.0 us additional mass of compacted material slows plastic wave to less than elastic wave. Material ahead of plastic wave is preloaded to Hugoniot Elastic Limit (HEL) prior to compaction and remains steady while plastic wave press. exceeds HEL t=4.0 μsec Elastic wave continues on at constant speed while plastic wave slows further due to addition of mass. Plastic wave pressure drops rapidly as mass continues to be added while load is transferred ahead of the plastic wave into the elastic region.

t=6.0 μsec

Figures 4A-E Generalized view of gauge traces from SA/CBC impacted by a speed flyer plate as shown in Figures 3A-E Generalized view of gauge traces in a compacted SA/CBC target showing spread of load and attenuation of peak pressure High strain rate SA/CBC equation of state data for formulations S1, S5, S8, H and S8, D in stress vs. particle velocity space.

High strain rate SA/CBC Equation of state data for formulations S1, S5, S8, H and S8, D in stress vs. volumetric strain space.

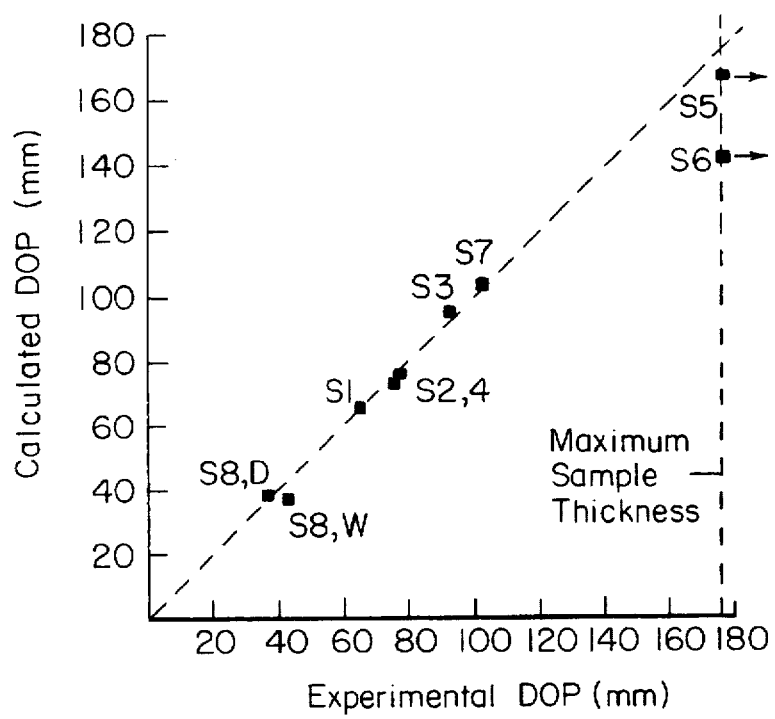
FIG. 8 Experimental vs. calculated depth of penetration into SA/CBC material.
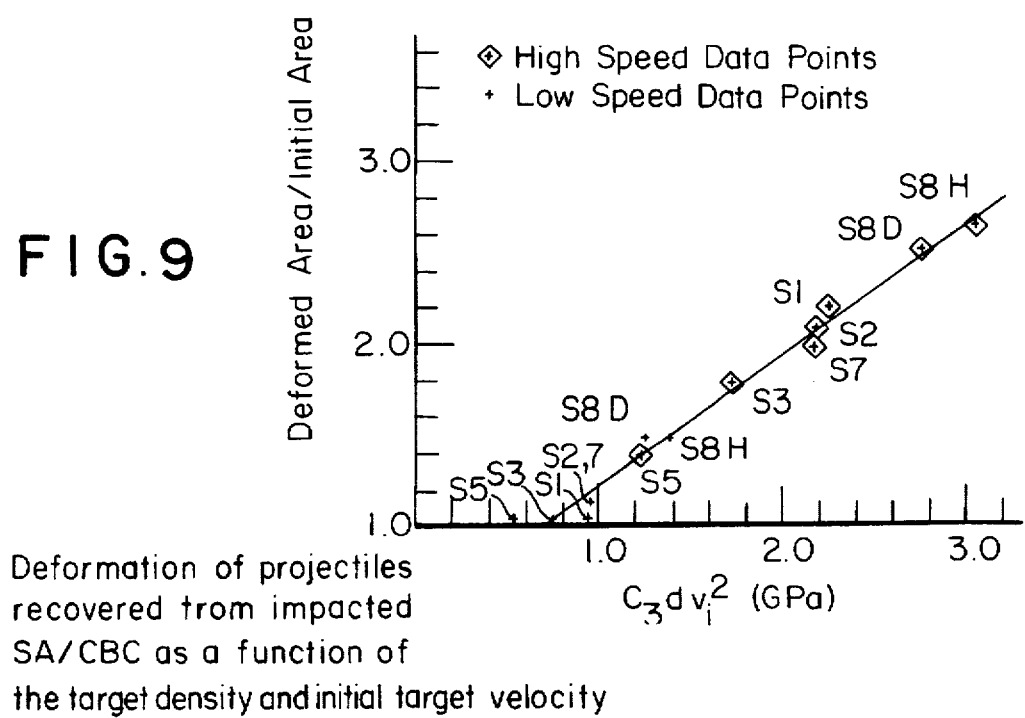
FIG. 9
Deformation of projectiles recovered from impacted SA/CBC as a function of the target density and initial target velocity

MATERIALS FOR SHOCK ATTENUATION

This invention relates to shock attenuating chemically bonded, ceramic materials which exhibit a combination of properties which make them particularly useful in applications where shock attenuation is of significant importance, e.g. in environments where the materials are subject to shock waves from explosives or from seismic sources, and particularly for magazine construction, or as materials for security walls and doors, or for the construction of buildings resistant to a strong blast, depending on the porosity and on the density of the materials. More particularly it relates to chemically bonded ceramics which have densities that range from 30 to 160 lb/ft$^3$ (0.48 to 2.56 g/cc) and porosity of 20 to 80%.

The low density materials display excellent weight efficiency while the higher density systems are the most space efficient shock attenuating materials available particularly in strong shock environments. These features coupled with their relatively low cost, easy formability and non-flamability make them very well suited to ammunition storage, applications. The range of porosity, density and strengths that are available allow them to be tailored to specific ammunition storage applications or blast resistant barrier designs.

A discussion of the development of and the properties desired in such materials is found in a paper entitled, "Development of Shock Absorbing Barrier Materials For High Performance Magazine Construction" by Claudio Herzfeld and Sean Wise, presented at the 26th Explosives Safety Seminar, sponsored by the Department of Defense/Explosive Safety Board on Aug. 16–18,1994. The contents of this paper are incorporated in this application by this reference.

OBJECTS

One object of the invention is to provide new materials which attenuate shock.

Another object of the invention is to provide shock attenuating materials which provide ballistic protection in an ammunition storage environment.

A further object is to formulate chemically bonded ceramics materials in which the density, strength and porosity are controlled to provide shock attenuating properties which are more space efficient than previously known materials.

A further object is to provide compositions which are relatively low in cost, possess easy formability, and non flamability and which are formulated from readily available materials.

THE INVENTION

This invention is an improvement over the light weight cementitious compositions described in one or more of the following recently issued United States patents, the disclosures of which are incorporated by this reference:

| Miller et al | 4,501,830 | issued | February 26, 1985; |
| Rizer et al | 4,504,320 | issued | March 12, 1988; |
| Wise et al | 4,599,211 | issued | July 8, 1986; and |
| Double et al | 4,780,141 | issued | October 25, 1988. |

As described in these patents, cementitious compositions comprising Portland cement, silica fume, fillers, dispersing agent and other additives may be produced with properties useful for a variety of purposes.

The present invention is directed to improved novel compositions which produce products having densities that range from 30–160 pounds per cubic foot (0.048 to 2.56 g/cc) and porosities of 20 to 80%. These materials were found to be excellent shock attenuating materials and to exhibit a high degree of space efficiency. Sympathetic detonation of class 1.1 munitions is one of the most severe hazards associated with munitions storage as well as one of the most difficult to control. Traditionally, quality distance (QD) requirements have been employed to mitigate the hazards to personnel and property but this reduces the explosive weight of munitions stored in a given storage location and increases operational costs. Realizing the benefits of reducing the sensitivity of munition to unplanned stimuli, the military has established insensitive munitions (IM) standards for new weapon systems in MI Std 2105A. These standards address impact by shaped charge jets, fragments, bullets, and spall, slow and fast cool-off as sympathetic detonation. Methods and design strategies for high performance ordnance items have been developed that provide acceptable response to most of these unplanned stimuli with the exception of sympathetic detonation. In this latter case, explosive fills that display reduced sensitivity to sympathetic detonation often have unacceptable performance so they are rejected by the user.

Packaging solutions to the sympathetic detonation problem using the materials of this invention can overcome the IM- performance trade-off.

DESCRIPTION OF THE DRAWINGS

The invention will be better understood from the description which follows taken in conjunction with the drawings in which:

FIG. 8 shows experimental or calculated depth of penetration into SA/CBC material and FIG. 9 shows deformation of projectiles recovered from impacted SA/CBC as a function of target density and initial projectile velocity.

All of the SA/CBC (shock attenuating/chemically bonded ceramics) formulations of this invention contain portland cement, silica fume, and hollow fillers. Usually, the hollow filler is a coarse particle relative to the cement and is essentially inert. Hollow fillers useful in this invention include, glass bubbles, mineral bubbles and a manufactured multicellular bubble. In addition, many of the formulations contain some sort of fiber, either organic, glass or metal. The organic is used to control the response of the material to fire (it prevents spalling), glass is used for toughening and improving tensile strength while metal (steel or stainless steel) is used for toughening and increasing the density.

Figure 1:
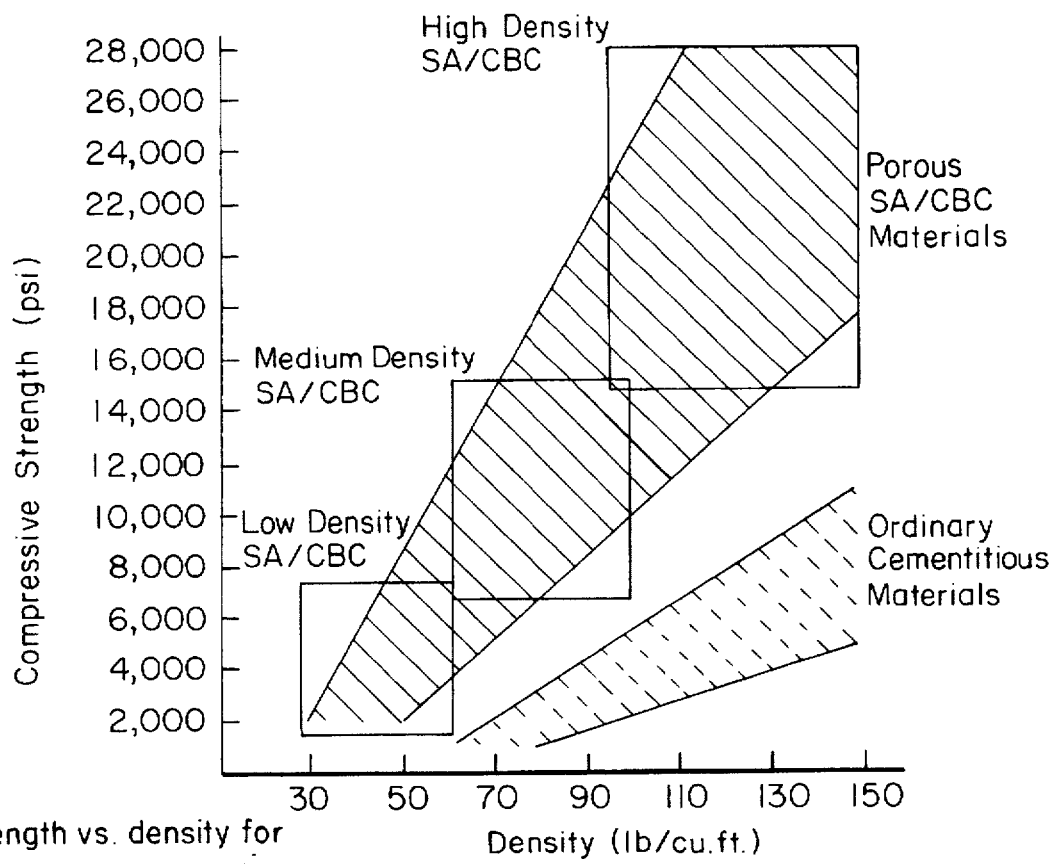
FIG. 1 is a graph showing a range of strength versus density of materials of this invention as compared with strength versus density of traditional prior art cement based systems.

The materials of this invention are all porous and may be grouped by density and strength, as shown in FIG. 1. All the strength to density ratios obtained are at least a factor of 2 higher than for traditional lightweight mortars and concretes. The first group are the lightest weight formulations with densities of 30 to 65 pound/ft$^3$ (0.48 to 1.05 g/cc). Their compressive strengths range from ~1500 psi to 7,000 psi, while their calculated pore volumes range from 50% up to 80%. The second or middle density group have densities in the range of 65 to 110 pound/ft$^3$ (1.05 to 1.75 g/cc) and have compressive strengths in the range of 7,000 psi to 15,000 psi. The porosity of these systems is in the range 35 to 50 percent. The third or high density group have densities in the range of 110 to 160 pound/ft$^3$ (1.75 to 2.6 g/cc) and have compressive strengths of 15,000 psi to nearly 30,000 psi and are still quite porous. Most of the products of the high density group have a minimum 20 percent porosity before drying and all have in excess of 40% porosity after drying. The combination of strength, density, and porosity makes each of these systems very effective at attenuating strong shock and providing ballistic protection.

Figure 2:
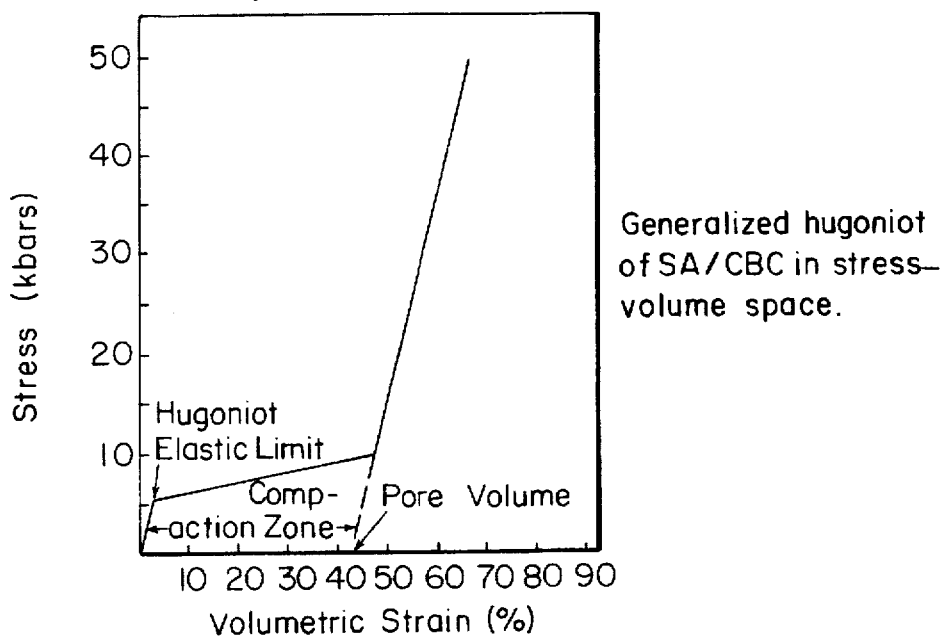
FIG. 2 is a generalized Hugoniot in stress volume space.
Figure 3D:
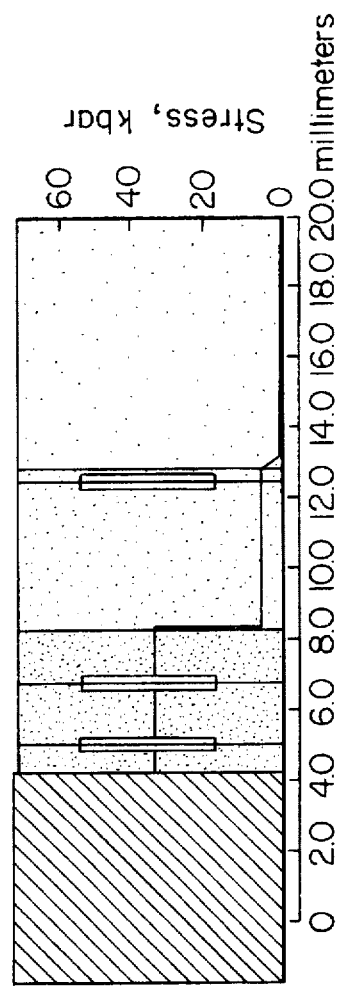
FIGS. 3 A–E are a series of Figures showing the response of the materials of this invention to impact by a high speed steel plate creating a very strong shock.
Figure 3E:
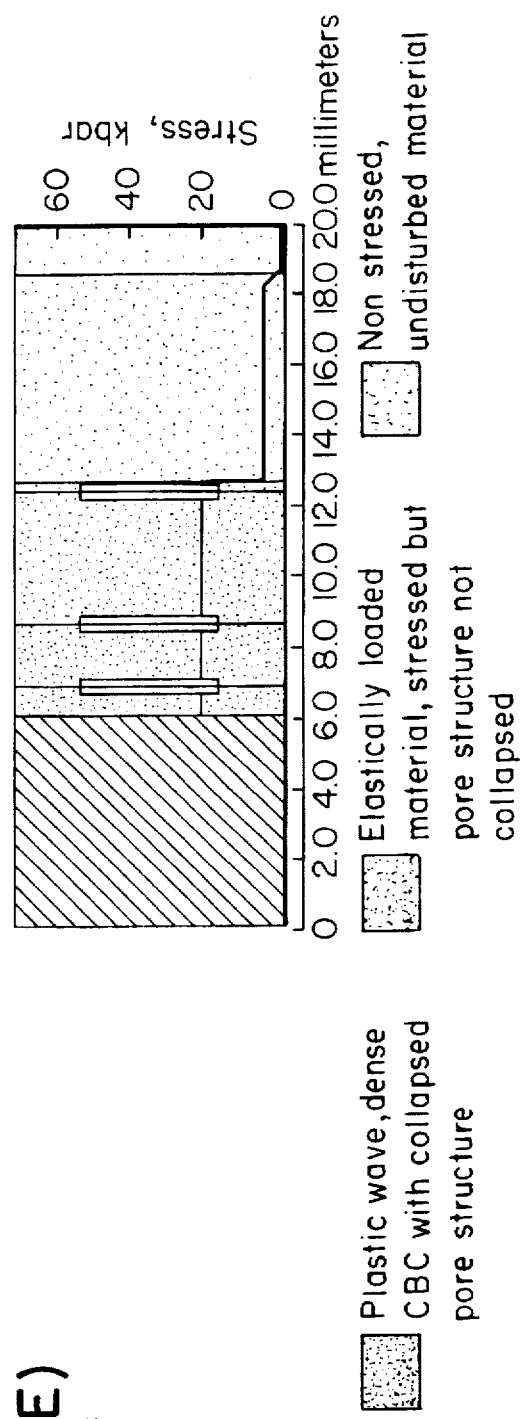
Figure 4A:
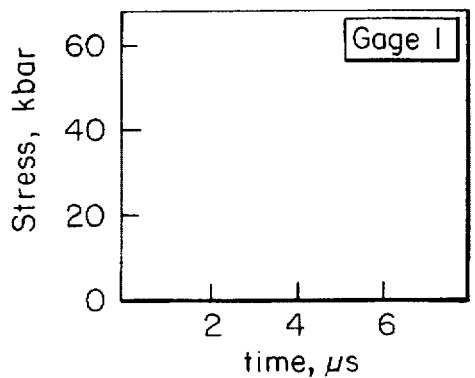
FIGS. 4A–E are a series of figures showing a generalized view of gage traces in a compacted SA/CBC target showing spread of load and attenuation of peak pressure.
Figure 4B:
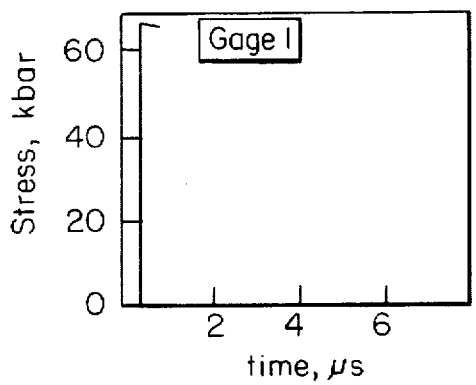
Figure 4C:
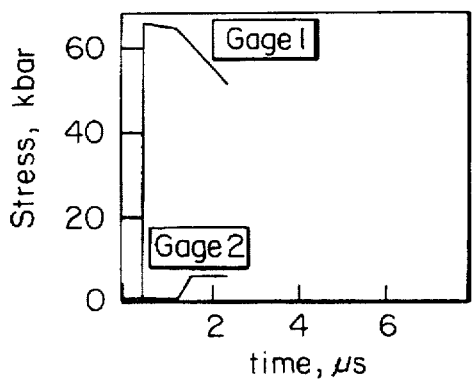
Figure 4D:
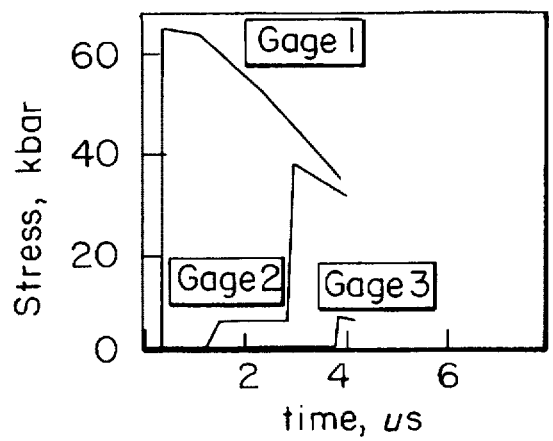
Figure 4E:
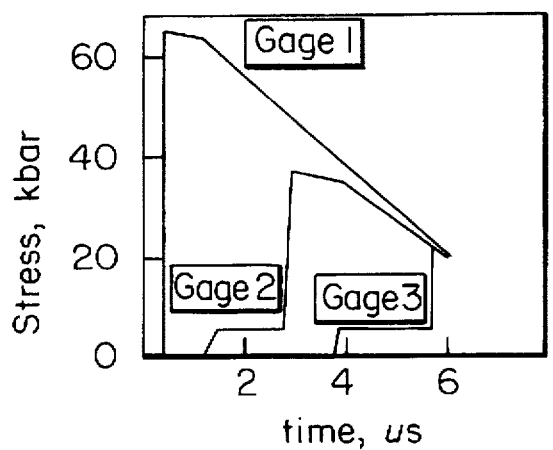

The attenuation of a shock in the SA/CBC materials of this invention is related to strength, porosity and density. Typically, these porous materials undergo an irreversible crushing when they are loaded at high strain rates. This is shown in FIG. 2 which is a generalized Hugoniot plot in stress-volume space. When the material is impacted, it loads to its elastic limit with only a small amount of strain. If this elastic limit is exceeded, the pores collapse while the material continues to bear load at slightly above the elastic limit. Once the porosity has completely collapsed, the material again loads rapidly with a relatively small increase of strain. The area under the curve in the compaction zone can be considered to be proportional to the energy absorbtion capability of the material.

This analysis of the SA/CBC's performance only goes part way in explaining the importance of two of the key material properties. It is easy to see how increases in strength and porosity would lead to an increase in the shock attenuation capability of the material. However, this representation does not account for the influence of the density of the material which plays an important role in very strong shock environments. To assess this, it is important to analyze what happens when the SA/CBC is impacted from a strong shock, such as that which occurs when a metal plate strikes the SA/CBC at very high velocity.

Figure 5:
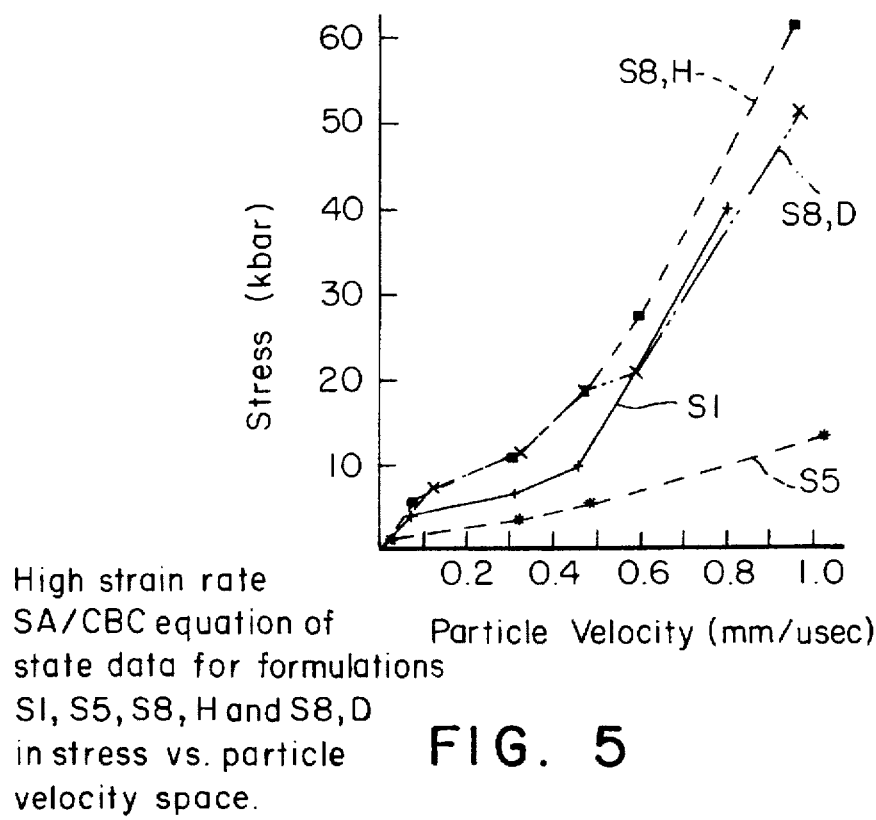
FIGS. 5,6 and 7 show High Stress rate test results for various SA/CBC materials plotted as Stress vs. Velocity (FIG. 5), Stress vs. Volumetric Stress (FIG. 6), and Stress vs. Specific Volume (FIG. 7)
Figure 6:
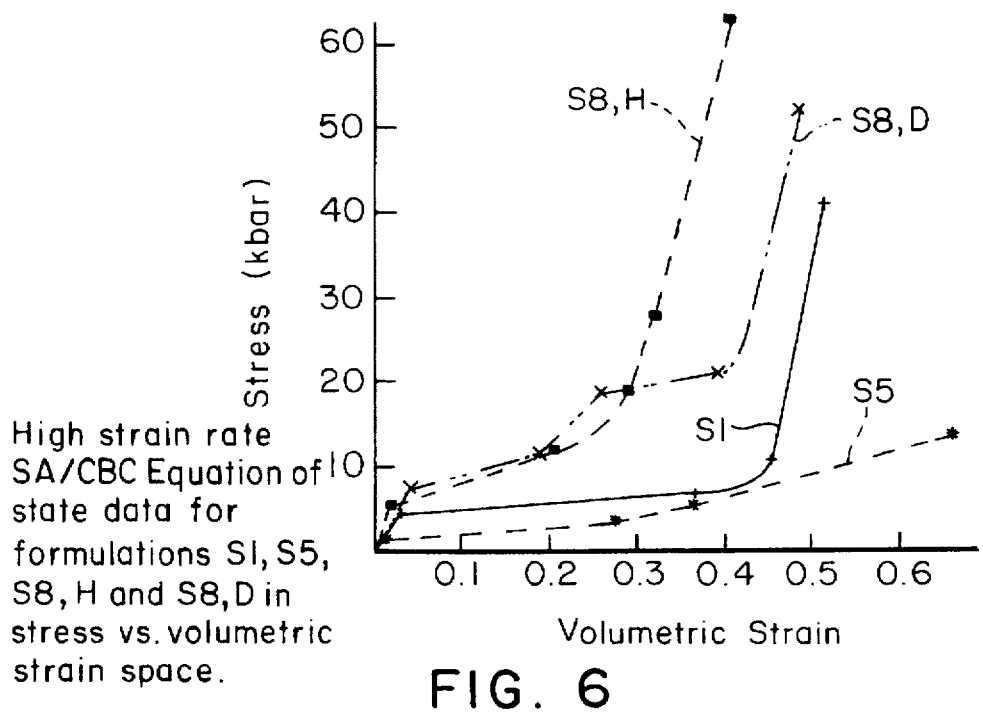
Figure 7:
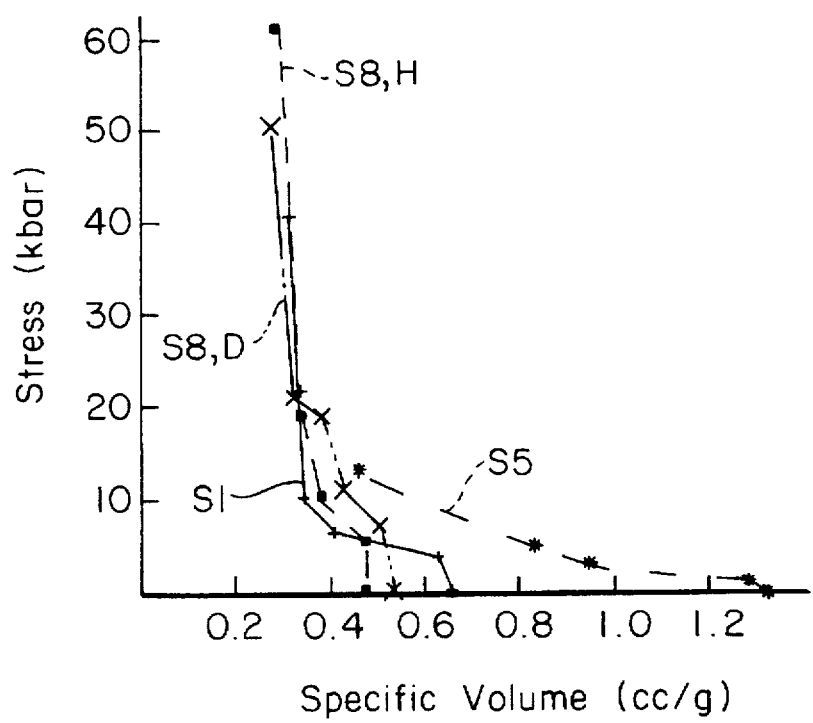

A high speed impact causes a very fast compaction or plastic wave to be set up in the material. If this plastic wave exceeds the sound speed (or elastic wave speed) of the target, the crushing strength characteristics of the material will matter little. Rather, shock pressure will be attenuated when mass is added to compacted material and accelerated. Due to conservation of momentum, the plastic wave velocity will then be reduced which will in turn cause a reduction in pressure. Once the plastic wave speed drops below the elastic wave speed, stress will be distributed ahead of the plastic wave through an elastic loading mechanism leading to even more rapid reduction in magnitude of the peak stress as the plastic wave transitions through the material. Finally, when the stress in the plastic wave drops below that of the Hugoniot Elastic Limit (HEL), the stress will be transmitted as it would in any other non-porous material without plastic deformation. High strain rate test results are shown in FIGS. 5, 6, and 7 for selected SA/CBC materials in Stress-Velocity, Stress-Volume and Stress-Specific Volume projections. In these Figures the relatively high dynamic strength of the materials coupled with their high plastic strain capability are clearly visible.

Controlling the HEL can be used to limit the impact forces on either a target or a projectile. If the impact velocities are low enough such that an overdriven shock wave will not be imparted to the target material, then the maximum impact pressure will be near the HEL so long as the porosity is not completely crushed out of the SA/CBC. If the HEL then is well below an explosive's initiation threshold, it will not be initiated from this impact.

Besides attenuating shocks, the shock attenuating chemically bonded ceramics (SA/CBC) of the invention provide good resistanace to penetration of high speed fragments. Fragment impact testing revealed that depth of penetration (DOP) into the SA/CBC and fragment deformation are functions of the density and the compressive strength of the target material. The DOP was found to be more strongly correlated to the strength of the target material at low speed (<1.0 km/sec) while the fragment deformation is very strongly related to the target density, particularly at high speed (>1.5 km/sec.) An expression that accounts for target material's strength and density as well as projectile's velocity is the Poncelet equation which was used to analyze SA/CBC's ballistic penetration data.

The Poncelet equation defines the intrafacial forces F, between the fragment and the target as a function of the target material's compressive strength, y, density, p, projectile velocity, v, and impact area A as shown in the equation. The $C_1 y$ term in this equation is the force acting on the projectile due to the target material's strength while the $C_3 p v^2$ term is the drag force acting on the projectile.

$$F + ma = -(C_1 y + C_3 p v^2) A \qquad \text{Poncelet Eqn.}$$

From this equation, a second expression can be derived that shows the depth of penetration, x, as a function of the material parameters and the projectile mass and initial velocity ($v_1$) as shown in the equation below $$x = \frac{m}{2 C_3 p A} \ln \left[ \left( v_1^2 + \frac{C_1 y}{C_3 p} \right) \frac{C_3 p}{C_1 y} \right]$$

DOP Eqn. derived from Poncelet Eqn.

Through a series of ballistic tests in which fragments were shot at thick samples of a variety of SA/CBC targets, a value for $C_1$ of 5.4 was found along with a value of 0.6 for $C_3$. The DOP equation derived from the Poncelet equation provides a very good prediction of penetration into SA/CBC targets so long as the projectile does not deform (See FIG. 8). In addition, the interfacial force calculated using the drag term of the Poncelet equation are proportional to the deformation found in fragments shot at high speed into the SA/CBC (See FIG. 9).

The ballistic data and subsequent analysis show that density accounts for much of the SA/CBC's penetration resistance to fragments at very high speeds. The Poncelet equation suggests that the density accounts for 75% of the force acting on a projectile traveling through a SA/CBC material at 1830 m/s (6000 ft/s) and 85% of the force acting on a projectile at 2300 m/s (7500 ft/s). The density is also primarily responsible for projectile deformation which can lead to substantially lower depth of penetration. Impacts at these speeds create an overdriven shock in the SA/CBC.

The strength is the dominant factor in bringing the fragments to a stop once velocities are less than ~1000 m/s (3000 ft./sec). Surprisingly, the pore content does not directly figure into the calculations. Pore content is still an indirect factor in that the total porosity will effect the density and the mechanical strength. The effect of porosity on strength can be minimized, however, if the pores are made small enough as was done with the S8 formulations described below. In fact, the best material ballistically was dried S8 which had a pore content of 43%.

Using the high strain rate (Characterization data from the SA/CBC materials it is possible to assess their performance in different environments and determine what materials are suitable to different applications. The paragraphs below review these grouped into differing density regimes.

The lightest materials of this invention are intended to be used in weak shock environments such as those where there is a relatively small amount of explosive in a given volume or where impact velocities are quite low. Examples of these materials are set forth in Table 1. The lightest weight material in Table 1 is the formulation labeled GC2 with a density under 40 lb/cu. ft. It provides shock absorbtion and ballistic resistance to fragments for 40 mm grenades in a storage container separated by less than 1.25 inches of material. The material also provides thermal insulation in case of fire.

Formulations S6 and MBW 60 have been used as an integral part of a barrier was separating stacks of ammunition. The function of the material was to act as a cushion on the face of the wall. If a detonation occurred in one storage cell the barrier wall would stop the high velocity fragments in its core but would be pushed out into the stacks of ammunition in other cells. The SA/CBC cushion is designed to prevent a hard impact with the ammunition and cause it to detonate. These impacts are less than 200 m/s. The strength range of the SA/CBC has upper and lower limits in order for the wall to perform its function. Manufacturing quality control combined with the design of the formulations allow this level of performance to be achieved. This principle was successfully demonstrated earlier this year. The material helps provide a cost effective solution for magazine construction which will allow more ammunition to be stored safely in a limited area.

The light weight materials of Table 1 have significant commercial potential beyond ammunition storage. They could be used as structural insulation for fabrication of low rise (<3 story) buildings or as an energy absorbing material in building subjected to seismic loading or blast loading. The use of an SA/CBC material such as those in Table 1 may provide a means to keep the loads on a structure within a manageable level, even for severe attacks such as the one in Oklahoma City.

Examples of the medium density porous materials of this invention are shown in Table 2. These materials provide exceptional strength at moderate density. They have significant resistance to impact from fragments, bullets and hammers because of their high compressive strength yet still provide good shock absorbing capabilities. These systems provide a good balance of weight efficiency in ammunition storage coupled with ballistic protection. The combination of strength, density and porosity make them suitable for security applications such as walls and doors where good penetration resistance at low barrier weight is a critical issue.

Table 3 sets forth Examples of high density SA/CBC materials of this invention. They provide maximum strength, density and porosity (>40% in most cases). High performance cement based systems previously have been made with strengths and densities of 25,000 psi at a density of 150 pound/ft$^3$ (respectively) but these are made with minimal porosity. The high density SA/CBC systems are the most volume efficient materials in a very strong shock environment (>30 kbars) and hence are suitable for barriers that have to perform in a limited space. The ballistic weight efficiency of the highest strength systems in this set in nearly equivalent to aluminum for very high speed fragments.

The pore system in these high density mixes is extremely fine. The closed cell pore system is made from a 10 micron hollow particle (55% void volume) called "Sphericell 110 P8" that has a hydrostatic crushing strength of nearly 20 kpsi. A high volume fraction (0.45) of these particles is packed into the S8 formulation producing about 25% of the total porosity in the mix. With a water/cement ratio of 0.55, a compressive strength of 20–25 kpsi is obtained once the water is removed by thermal treatment. These Sphericell hollow fillers are also included in the highest density SA/CBC formulations. In these however, a water/cement ratio of 1.44 is used in order to create additional void volume when dried. Even with this exceptionally high water content, compressive strengths of 15 kpsi are obtained leading to speculation that the particles may be acting as a pozzolanic materials.

As seen from Tables I, II and III, discussed above, the shock attenuating, chemically bonded ceramic materials of this invention comprise the following:

A. Portland cement
B. silica fume
C. hollow fillers
D. dispersing agent
E. other additives, and
F. water

A. Portland Cement

Any of the various grades of Portland cement described in the above noted U.S. patents, are suitable for the present invention. Too much cement increases the product density and too little cement yields products which are too weak. In the examples which follow, LWPC refers to Lehigh White Portland Cement. The amount of Portland cement is usually between about 6% and about 40% by weight.

B. Silica Fume

The chemically active silica fume used in the mixtures which produce the cementitious composite materials of this invention is preferably an amorphous, non-crystalline, pozzolanic silicon dioxide and is preferably condensed silica fume. This condensed silica fume is produced as a byproduct in the electric arc furnace production of silicon or silicon alloys such as ferrosilicon. The gases which are evolved during the manufacture of ferrosilicon from quartz, coke and iron ore when they are heated to about 2000° C., contain Si and SiO vapors which form $SiO_2$ when they react with air as they emerge from the furnace. These vapors condense and the very tiny spherical particles which result from condensation of the vapors are almost entirely amorphous silica with a 15–20 m$^2$/g surface area. Typically, the particles analyze 85–92% $SiO_2$, and the remainder being small amounts of alumina, lime and magnesia. The particles range from 0.01 to 0.3 micron with about 70% being smaller than 0.1 micron. This material is described in U.S. Pat. No. 4,321,243 issued Mar. 23, 1982.

This constituent is believed to have pozzolanic properties in the present compositions. Although in itself it possesses little or no cementitious value, at ordinary temperatures, in the presence of moisture, it will chemically react with calcium compounds to form compounds possessing cementitious properties.

C. Hollow Filler

Any of a wide variety of hollow fillers may be used in the formulation of the present invention, including glass bubbles, mineral bubbles, and a manufactured multi-cellular bubble. One particularly preferred hollow filler is the fly ash cenospheres which are commercially available as Fillite (RTM) and are described in U.S. Pat. No. 3,782,985. Another preferred hollow filler is the siliceous spheres sold as Sphericell 110 P8. A third suitable filler is a glass bubble obtained from 3M called Scotchlite (RTM). It is available in densities that range from approximately 10 lb/cu ft (0.15 g/cc) to 40 lb/cu ft (0.6 g/cc).

D. Dispersing Agent

The compositions of this invention include a dispersing agent or plasticizer in the formulations. One such dispersing agent used to make the mixture more fluid is sold as Mighty 100 or Mighty 150 in which the active ingredient is the sodium salt of the formaldehyde condensate of naphthalene beta sulfonic acid. Other similar materials may be used as dispersing agents.

E. Other Ingredients

The inclusion of a fiber improves the properties of many of the compositions of this invention. The fiber may be either organic (e.g. synthetic resin polymer) or inorganic (e.g. glass or metal). Combinations of fibers may be used. It has been found that glass fibers are useful for toughening and increasing the tensile strength of the material while metal such as steel or stainless steel also toughens the product and increases the density.

F. Water

The density and porosity of the final product are influenced by the amount of water in the formulation. For low density products the amount of water is preferably between 20 and 35%, for medium density it is between 10 and 20%, and for high density between 9 and 13%. The relative proportions of the other ingredients may be varied depending on the density and porosity desired in the final product. Suitable ranges are given in Table 4.

TABLE 1

LOW DENSITY MATERIALS

| Formulation | GC2 | | | S6 | | | MBW 50 | | | MBW 60 | | |
|---|---|---|---|---|---|---|---|---|---|---|---|---|
| Ingredients | Wt. % | Vol. % | Type | Wt. % | Vol. % | Type | Wt. % | Vol. % | Type | Wt. % | Vol. % | Type |
| Cement | 33.34 | 7.84 | LWCP | 37.38 | 11.1 | LWPC | 35.4 | 9.02 | Type II | 34.07 | 10.21 | Type III |
| Silica Fume | 16.67 | 5.88 | | 11.65 | 5.19 | | 10.8 | 4.06 | | 11.52 | 4.78 | |
| Disp. Agent | 1.25 | 0.58 | M-100 | 1.03 | 0.63 | M-100 | 0.7 | 0.41 | Melment | 0.93 | 0.62 | Borem. HSP |
| Water | 33.34 | 24.7 | | 24.29 | 22.72 | | 26.6 | 21.98 | | 24.66 | 23.26 | |
| Other Binder Ing. | | | | | | | | | | 0.01 | 0.01 | Pozzolith |
| Bubble 1 | 12.15 | 60 | C15/250 | 24.32 | 0.38 | B38/4000 | 14.8 | 38.22 | Micorlite T | 15.18 | 44.22 | Microlite T |
| Bubble 2 | | | | | | . | 9.5 | 10.9 | Ext. SG | 12.39 | 16.24 | Ext. SG |
| Bubble 3 | | | | | | | 0.53 | 15 | Foam | | | |
| Fiber 1 | 3.24 | 1 | 0.25" AR | 1.28 | 0.5 | 1/4" AR | 1.6 | 0.54 | 0.5" E glass | 1.55 | 0.61 | 0.5" E glass |
| Fiber 2 | | | | | | | 0.1 | 0.08 | microfiber | 0.06 | 0.05 | microfiber |
| Properties | | | | | | | | | | | | |
| W/C OPC/SF Flow | 1 | 2 | 100 | 0.65 | 3.21 | 31 | 0.75 | 3.28 | 80 | 0.72 | 3.05 | 80 |
| Pore Volume % (H, D) | 70% | 78% | | 51% | | | 56 | | | 50% | | |
| Density (H, D) g/cc | 0.73 | 0.61 | | 0.88 | | | 0.84 | 0.8 | | 0.99 | | |
| Comp. σ E (psi) | 2000 | | | 6900 | | | 1500 | 5E+05 | | 2800 | 8E+05 | |
| Flex. σ E (psi) | | | | 610 | | | 300 | 6E+05 | | 500 | 8E+05 | |
| Shrinkage % | 0.1 | | | 0.08 | | | 0.1 | | | 0.1 | | |

TABLE II

MEDIUM DENSITY MATERIALS

| Formulation | S1 | | | S2 | | | S3 | | |
|---|---|---|---|---|---|---|---|---|---|
| Ingredients | Wt. % | Vol. % | Type | Wt. % | Vol. % | Type | Wt. % | Vol. % | Type |
| Cement | 35.18 | 17.11 | LWCP | 26.16 | 12.48 | LWPC | 32.94 | 12.74 | LWPC |
| Silica Fume | 16.29 | 11.81 | | 12.04 | 8.62 | | 20.5 | 11.9 | |
| Water | 13.45 | 20.48 | | 14.39 | 21.62 | | 18.12 | 22.07 | |
| Dis. Agent | 1.23 | 1.18 | M-100 | 0.91 | 0.88 | M-100 | 1.15 | 0.88 | M100 |
| Bubble 1 | 18.29 | 46.42 | S60/10000 | 20.53 | 51.42 | S60/10000 | 25.32 | 51.42 | S60/10000 |
| Bubble 2 | | | | | | | | | |
| Fiber 1 | 15.36 | 3 | | 29.52 | 5 | | 1.97 | 1 | 0.5" AR gla |
| Fiber 2 | | | | | | | | | |
| Properties | | | | | | | | | |
| W/C OPC/SF Flow | 0.38 | 2.17 | 65 | 0.55 | 2.17 | 60 | 0.55 | 1.61 | 44 |
| Pore Volume % (H, D) | 35% | | | 39% | | | 39% | | |
| Density (H, D) g/cc | 1.54 | | | 1.54 | | | 1.22 | | |
| Hyd. Comp. σ (psi) E (Mpsi) | 15000 | | | 12500 | | | 10250 | | |
| Dehyd. Comp. s (psi) E (Mpsi) | | | | | | | | | |
| Hyd. Flex. σ (psi) E (Mpsi) | 2100 | 1.76 | | 2700 | | | 1700 | 1.36 | |
| Dehyd. Flex. s (psi) E (Mpsi) | | | | | | | | | |
| Shrinkage % (Hyd.) | 0.1 | | | 0.08 | | | 0.09 | | |
| Shrinkage % (DeHyd.) | | | | | | | | | |

TABLE II-continued

MEDIUM DENSITY MATERIALS

| Formulation | S4 | | | 104 | | | L18 | | |
|---|---|---|---|---|---|---|---|---|---|
| Ingredients | Wt. % | Vol. % | Type | Wt. % | Vol. % | Type | Wt. % | Vol. % | Type |
| Cement | 27.81 | 13.09 | LWPC | 30.31 | 15.13 | LWPC | 36.93 | 20.29 | LWPC |
| Silica Fume | 11.01 | 7.77 | | 18.86 | 14.12 | | 18.17 | 14.3 | |
| Water | 12.92 | 19.15 | | 13.64 | 21.45 | | 13.29 | 2301 | |
| Dis. Agent | 0.84 | 0.77 | M100 | 1.06 | 1.04 | M100 | 1.29 | 1.39 | M100 |
| Bubble 1 | 16.65 | 41.15 | S60/10000 | 20.03 | 45 | | 16.68 | 38 | Ext. SF10 |
| Bubble 2 | 9.72 | 13.1 | Shericell | | | | | | |
| Fiber 1 | 2.28 | 1.38 | 0.5" AR gla | 16.12 | 3.25 | 434 SS | 13.64 | 3 | 0.5" RT, Brass Coated |
| Fiber 2 | 18.83 | 3.58 | 434 SS | | | | | | |
| Properties | | | | | | | | | |
| W/C OPC/SF Flow | 0.46 | 2.52 | 29 | 0.44 | 1.61 | 68 | 0.38 | 2.03 | 59 |
| Pore Volume % (H, D) | 36% | | | 32.4% | 46.4 | | 27.36 | 46 | |
| Density (H, D) g/cc | 1.52 | | | 1.57 | 1.44 | | 1.77 | 1.59 | |
| Hyd. Comp. σ (psi) E (Mpsi) | 12500 | | | 13000 | | | 16000 | | |
| Dehyd. Comp. s (psi) E (Mpsi) | | | | 14900 | | | 17000 | | |
| Hyd. Flex. σ (psi) E (Mpsi) | 3200 | 1.46 | | 2100 | 1.86 | | | | |
| Dehyd. Flex. s (psi) E (Mpsi) | | | | 2340 | 1.25 | | 4500 | 0.7 | |
| Shrinkage % (Hyd.) | 0.06 | | | 0.1 | | | 0.1 | | |
| Shrinkage % (DeHyd.) | | | | 0.2 | | | 0.2 | | |

TABLE III

HIGH DENSITY MATERIALS

| Formulation | S8 | | | LC S8 | | | High p Porous | | |
|---|---|---|---|---|---|---|---|---|---|
| Ingredients | Wt. % | Vol. % | Type | Wt. % | Vol. % | Type | Wt. % | Vol. % | Type |
| Cement 1 | 20.26 | 12.89 | | 18.39 | 11.59 | Class H | 7.92 | 6.67 | LWPC |
| Cement 2 | | | | 2.03 | 1.3 | Type K | | | |
| Silica Fume | 12.56 | 11.99 | | 12.56 | 11.98 | | 4.91 | 5.92 | |
| Water | 10.73 | 21.49 | | 10.74 | 21.51 | | 11.41 | 30.26 | |
| Disp. Agent | 0.82 | 1.03 | M100 | 0.82 | 1.03 | | 0.39 | 0.65 | M100 |
| Bubble 1 | 24.48 | 44.6 | Sper. 110P8 | 24.49 | 44.6 | Sper. 110P8 | 14.93 | 36 | Sper. 110P8 |
| Other Filler | | | | | | | 41.16 | 14 | Iron Sponge |
| Fiber 1 | 31.14 | 8 | 434 SS | 31.15 | 8 | S 207 CS | 19.28 | 6.5 | 434 SS |
| Properties | | | | | | | | | |
| W/C OPC/SF Flow | 0.53 | 1.61 | 36 | 0.53 | 1.61 | 48 | 1.44 | 1.61 | 88 |
| Pore Volume % (H, D) | 25% | 43% | | 25% | 43% | | 20% | 44.2% | |
| Density (H, D) g/cc | 2.1 | 1.9 | | 2.1 | 1.9 | | 2.8 | 2.53 | |
| Hyd. Comp. σ (psi) E (Mpsi) | 19000 | | | 17000 | | | 9000 | | |
| Dehyd. Comp. s (psi) E (Mpsi) | 22000 | | | 26500 | | | 19000 | | |
| Hyd. Flex. σ (psi) E (Mpsi) | 4350 | 2.5 | | | | | | | |
| Dehyd. Flex. s (psi) E (Mpsi) | 4000 | 0.9 | | | | | | | |
| Shrinkage % (Hyd.) | 0.06 | | | | | | | | |
| Shrinkage % (DeHyd.) | 0.13 | | | | | | | | |

TABLE 4

| | Proportions % by Weight | | |
|---|---|---|---|
| | High Density | Medium Density | Low Density |
| Portland Cement | 6–21 | 25–40 | 33–40 |
| Silica Fume | 4–13 | 10–20 | 8–18 |
| Hollow Spheres | 14–25 | 15–30 | 10–30 |
| Water | 9–13 | 10–20 | 20–35 |
| Plasticizer | 0.3–0.9 | 0.5–1.5 | 0.5–105 |
| Fiber | 15–35 | 1–20 | 0.05–5 |
| Water/Cement | 0.5–1.5 | 0.35–0.65 | 0.6–1.1 |

We claim:

1. A settable cement mixture from which articles can be cast, said articles comprising a high porosity shock attenuating chemically bonded ceramic material having a density from about 30 to 160 lb/cubic foot and a porosity of about 20 to 80% and a compressive strength between about 500 and 30,000 psi when cast and set, said mixture comprising the following in percent by weight:
   (a) Portland Cement 6 to 40;
   (b) Silica Fume 4 to 18.86;
   (c) Hollow Inorganic Filler Particles 10 to 50;
   (d) Fibers 0.05 to 35;
   (e) Water 9 to 35; and
   (f) Plasticizer up to 2.

2. A mixture according to claim 1 in which the relative proportions in weight percent are:
   Portland cement 6–21, silica fume 4–13
   Hollow Inorganic Filler Particles 14–25 fibers 15–35
   Plasticizer 0.03–0.09 and water 9–13;
and the high porosity material produced has a density from about 110 to about 160 lb/cubic foot a porosity of at least about 20% and a compressive strength between about 15,000 psi and about 30,000 psi.

3. A mixture according to claim 1 in which the relative proportions in weight percent are:
Portland cement 25–40, silica fume 10–18.86
Hollow Inorganic Filler Particles 15–30, fibers 1–20
Plasticizer 0.5–1.5 and water 10–20;
and the high porosity material produced has a density from about 65 to about 100 lb/cubic foot a porosity of between about 35 and about 50%, and a compressive strength between about 5,000 psi and about 15,000 psi.

4. A mixture according to claim 1 in which the relative proportions in weight percent are:
Portland cement 33–40, silica fume 8–18
Hollow Inorganic Particles 10–30, fibers 0.05–5
Plasticizer 0.5–1.5 and water 20–35
and the high porosity material produced from the mixture has a porosity of between 50% and 80% a density from about 30 to 65% and a compressive strength between 500 and 7,000 psi.

5. A mixture according to claim 1 in which the fibers are selected from the group consisting of organic fibers, glass fibers and metallic fibers and mixtures thereof.

6. A mixture according to claim 1 in which the fibers are organic.

7. A mixture according to claim 1 in which the fibers are glass fibers.

8. A mixture according to claim 1 in which the fibers are metallic.

9. Shock attenuating articles produced by casting a mixture of claim 1, and permitting the mixture to set or harden.

10. Shock attenuating articles produced by casting a mixture of claim 1 and dehydrating the article after it has set.

11. Shock attenuating magazines or ammunition storage racks produced by the process of claim 9.

12. Shock attenuating building components produced by the process of claim 9.

13. A shock attenuating material having a density from about 30 to 160 lb/cubic foot and a porosity of about 20 to 80% and a compressive strength between about 500 and 30,000 psi and which has been produced from the mixture of claim 1.

14. The material of claim 1 in which the density is from about 30 to 65 lb/cubic foot, the porosity is between 50% and 80% and the compressive strength is between 500 and 7,000 psi, and which has been produced from the mixture of claim 4.

15. The material of claim 1 in which the density is from about 65 to 100 lb/cubic foot, the porosity is between about 35% and about 50%, and the compressive strength is between about 5,000 psi and 15,000 psi, and which has been produced from the mixture of claim 3.

16. The material of claim 1 in which the density is from about 110 to about 160 lb/cubic foot, the porosity is at least about 20%, and the compressive strength is between about 15,000 psi and about 30,000 psi and which has been produced from the mixture of claim 2.

17. A shock attenuating chemically bonded ceramic material having a density from about 30 to 160 lb/cubic foot and a porosity of about 20 to 80% and a compressive strength between about 500 and 30,000 psi and which has been produced from the mixture of claim 1.

18. A shock attenuating chemically bonded ceramic material of claim 17 in which the density is from about 30 to 65 lb/cubic foot, the porosity is between about 50% and 80% and the compressive strength is between 500 psi and 7,000 psi and which has been produced from the mixture of claim 4.

19. A shock attenuating chemically bonded ceramic material of claim 17 in which the density is from about 65 to 110 lb/cubic foot, the porosity is between about 35% and 50% and the compressive strength is between 5,000 psi and 15,000 psi and which has been produced from the mixture of claim 3.

20. A shock attenuating chemically bonded ceramic material of claim 17 in which the density is from about 110 to about 160 lb/cubic foot, the porosity is at least 20% and the compressive strength is between about 15,000 psi and about 30,000 psi and which has been produced from the mixture of claim 2.

* * * * *